US012619562B2

(12) United States Patent
McCall et al.

(10) Patent No.: US 12,619,562 B2
(45) Date of Patent: May 5, 2026

(54) UNIDIRECTIONAL COMMAND BUS PHASE DRIFT COMPENSATION BY SENDING THE COMMAND BUS DELAY TO MEMORY CONTROLLER

(71) Applicant: Intel Corporation, Santa Clara, CA (US)

(72) Inventors: James A. McCall, Portland, OR (US); Kuljit S. Bains, Olympia, WA (US); Christopher P. Mozak, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 23 days.

(21) Appl. No.: 17/890,500

(22) Filed: Aug. 18, 2022

(65) Prior Publication Data

US 2022/0393682 A1     Dec. 8, 2022

(51) Int. Cl.
*G06F 13/16*          (2006.01)

(52) U.S. Cl.
CPC ................................. *G06F 13/1689* (2013.01)

(58) Field of Classification Search
CPC ......................... G06F 13/1689; G06F 13/4234
See application file for complete search history.

(56) References Cited

U.S. PATENT DOCUMENTS

| | | | |
|---|---|---|---|
| 8,331,176 B2 | 12/2012 | Mozak et al. | |
| 9,218,575 B2 | 12/2015 | Mozak et al. | |
| 9,535,119 B2 | 1/2017 | Thiruvengadam et al. | |
| 10,573,272 B2 | 2/2020 | Mozak et al. | |
| 11,449,439 B1 | 9/2022 | Kariya et al. | |
| 2018/0090185 A1 | 3/2018 | Hossain et al. | |
| 2019/0114271 A1* | 4/2019 | Best .................... | G11C 11/4076 |
| 2022/0229791 A1* | 7/2022 | Prather ................ | G06F 3/0604 |

* cited by examiner

*Primary Examiner* — Chie Yew
(74) *Attorney, Agent, or Firm* — Compass IP Law PC

(57)          ABSTRACT

A system has an unmatched communication architecture for a unidirectional command bus and compensates for drift on the command bus based on data provided on a bidirectional data bus. The memory device has an oscillator to measure drift or an amount of delay for the command bus over a time interval. The memory device can return a value over the data bus to the memory controller based on the delay measured with the oscillator. Based on receiving the value, the memory controller can adjust configuration settings for communication on the command bus.

22 Claims, 6 Drawing Sheets

100

300

UNIDIRECTIONAL COMMAND BUS PHASE DRIFT COMPENSATION BY SENDING THE COMMAND BUS DELAY TO MEMORY CONTROLLER

FIELD

Descriptions are generally related to device communication, and more particular descriptions are related to phase drift compensation for a unidirectional command bus.

BACKGROUND

A memory subsystem has unidirectional command and address bus (which can be referred to as the CA bus or the command bus) and a bidirectional data bus. Memory input/output (IO) is source synchronous, where the sending device sends a strobe with the signal, which the receiving device uses to sample the information signal. The information signal is the data for the data bus and the command and address information for the command bus.

A matched architecture is common, where both the information signal and the strobe travel through the same impedance delay (e.g., the RC or resistive-capacitive delay), because the circuit components track common mode noise. As double data rate (DDR) memory speeds increase, there is a move away from a matched memory IO architecture to an unmatched memory IO architecture. An unmatched architecture provides significant benefits in transfer speed, but because the circuit components do not track common mode noise, there is a misalignment between the information signal and the strobe signal, which would cause incorrect sampling in the receiving device.

Temperature has a significant impact on noise, which changes the tracking of the clock signal compared to the information signal. Temperature effects do not generally affect the signal and clock alignment in a matched architecture. However, an unmatched architecture requires compensation for drift effects. With a bidirectional bus, the memory device can send the drift terms back to the host to enable the host to update transmit settings prior to send data back to the memory device receiver.

There is no inherent mechanism in a unidirectional bus to provide feedback to the transmitting device. Providing feedback for the unidirectional command and address bus could be accomplished with a separate sideband bus connected to the device to send updates to the host. However, a separate sideband bus would require extra pins, and can be slower than the channel itself.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
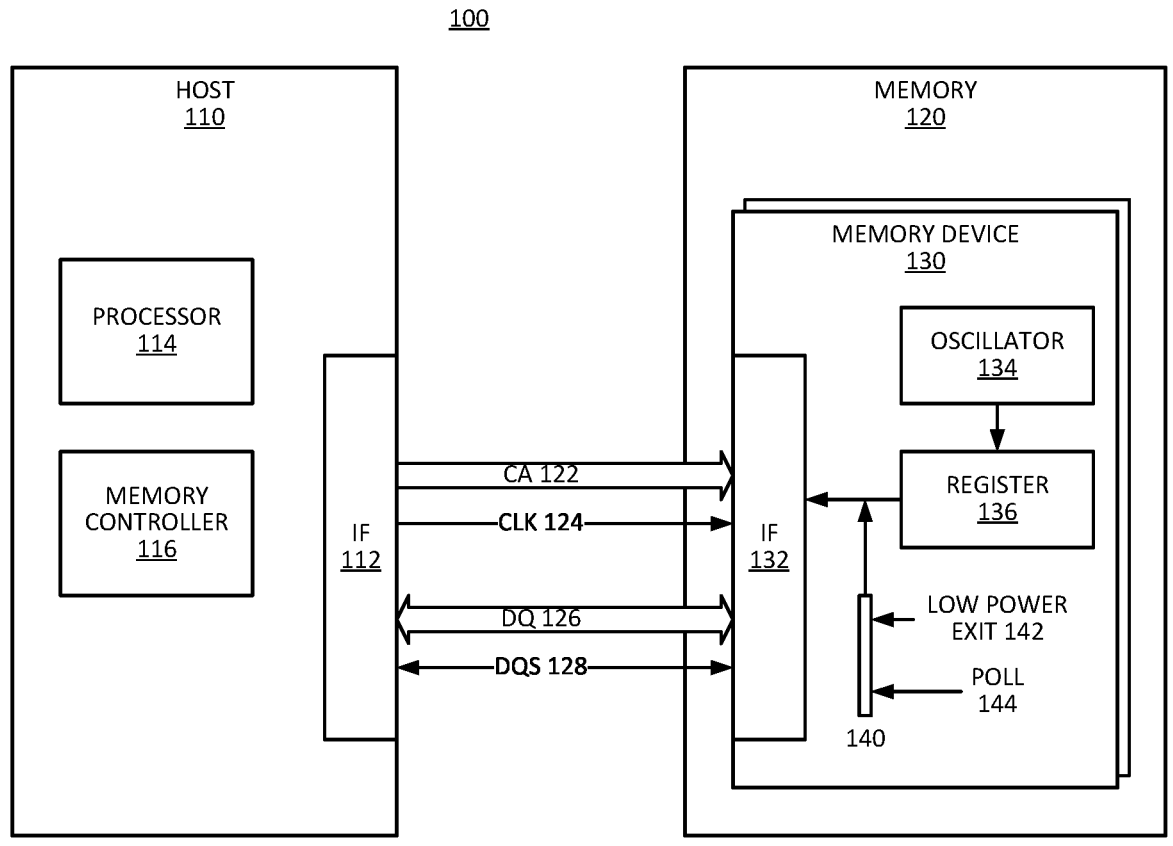
FIG. 1 is a block diagram of an example of a system with a command bus oscillator.

Descriptions of certain details and implementations follow, including non-limiting descriptions of the figures, which may depict some or all examples, and well as other potential implementations.

DETAILED DESCRIPTION

As described herein, a system has an unmatched communication architecture for a unidirectional command bus. As referred to above, in an unmatched architecture, the components have different noise responses, which causes a delay shift or drift between the clock and the command signal. The receiving device includes an oscillator to measure the drift for the command bus. The receiving device can provide a value over a bidirectional data bus to the sending device based on the delay measured with the oscillator. Based on receiving the value, the sending device can adjust configuration settings for communication on the command bus to compensate for drift.

An unmatched communication architecture can be applied to a memory system command and address (CA) bus, which is a unidirectional bus. The signal lines in the CA bus are used as unidirectional links from the memory controller to one or more memory devices, such as dynamic random access memory (DRAM) devices. The CA bus does not have a native feedback mechanism, since it is unidirectional. Instead of adding a feedback line from the memory device to the memory controller to pass CA bus drift information, the system can use the data bus, which is a bidirectional bus already present in the system.

The memory device can include a CA bus oscillator (e.g., a ring oscillator) to measure clock tree delay variation. In one example, the oscillator runs in the background without needing command or control from the host. Background operation can refer to control tasks executed by the memory device itself. An example of a background task in a memory device is an impedance calibration (ZQCal) operation. The ZQCal operation can be triggered by the host (e.g., the memory controller), but the memory device manages the operation internally. The ZQCal operation can store information such as updated settings in a register. In one example, the oscillator stores a value in a register. In one example, the memory device stores a value in a register that is based on or computed from the value generated by the oscillator.

Temperature change tends to have a measurable impact on the drift between the clock and the information signal, such as the command signals sent over a CA bus, as it has a significant impact on noise. However, the temperature changes relatively slowly compared to the operational speed of modern integrated circuits (ICs) such as memory devices.

In one example, the memory device triggers an operation of the oscillator often enough to track the drift due to temperature, such as updating a value once every second, or within the range of around a second.

When a memory device enters a low power state, such as power down or self-refresh, the temperature can drift. In one example, when a memory device performs a power down exit (PDX) or a self-refresh exit (SRX), the memory device automatically drives the value or values associated with the oscillator operation to the host. In one example, because exiting from a low power mode can result in drift to the data bus 10, the memory device drives the CA oscillator information to the host at a low frequency. A low frequency is a frequency lower than a normal operating frequency for the data bus. The low frequency can be on the order of ¼ frequency, ⅛ frequency, or some other frequency slower than normal operation.

The host receives and processes the value or values sent by the memory device. Based on the information provided by the memory device, the host can determine how to update transmit settings for the CA bus operation to ensure proper capture at the memory device receiver. After updating the transmit settings, the host can resume normal CA bus operation. Thus, the host can update settings to the CA bus IO to compensate for the unmatched command bus architecture based on feedback provided by the memory device over the data (DQ) bus.

FIG. 1 is a block diagram of an example of a system with a command bus oscillator. System 100 represents host 110 coupled to memory 120. While system 100 illustrates a memory system, the descriptions can apply to any system that has a unidirectional bus and a bidirectional bus.

Host 110 represents a computer system or other computing device to which memory 120 can be coupled. Host 110 includes processor 114, which represents one or more processor devices. Processor 114 can include one or more cores per processor device. Host 110 includes memory controller 116 to manage access to memory 120. Memory controller 116 can be an integrated memory controller (iMC) or a discrete memory controller.

Memory 120 represents system memory or main memory for host 110. Memory 120 includes one or more memory devices 130, which represent memory packages. The memory package can have one or more memory dies or chips. In one example, memory 120 represents an integrated memory device, such as a high bandwidth memory (HBM) device or other integrated system memory.

Memory 120 interfaces with host 110 through a memory interface, such as a double data rate (DDR), a low power double data rate (LPDDR), or some other memory interface. System 100 illustrates interface (IF) 112 in host 110, which couples to interface (IF) 132 of memory device 130. It will be understood that that host 110 can include an interface to couple to external memory. Memory controller 116 will also include an interface to the memory. Similarly, memory 120 as a module or memory package will include an interface to host 110, whether directly to memory controller 116, or through a host package to memory controller 116. Each memory device 130 will have an interface to receive commands and exchange data.

The connection between interface 112 and interface 132 can be referred to as the memory interface. The memory interface can include a command interface, which includes a command bus. The command interface and command bus can alternatively be referred to as command and address (CA) interface and command and address (CA) bus, respectively. The memory interface also includes a data interface, including a data bus.

The command interface includes command bus (CA) 122 and clock (CLK) 124. CA 122 provides signal lines operated as a unidirectional bus from host 110 (or from memory controller 116) to memory device 130. CA 122 provides command and address information to memory 120. CA 122 can control basic memory operation, such as read and write, and memory states, such as power down and self-refresh. Memory device 130 samples command and address information based on clock 124.

The data interface includes data bus (DQ) 126 and data strobe (DQS) 128. DQ 126 provides signal lines operated as a bidirectional bus from host (or from memory controller 116) to memory device 130. DQ 126 provides an interface to allow host 110 to pass data to memory 120 for a write operation, and to allow memory devices 130 to pass data to memory controller 116 for a read operation.

In one example, CA 122 has an unmatched receiver architecture, which can reduce power consumption relative to a matched architecture, but which can also have large delay variations as a function of temperature. In one example, system 100 compensates for the delay variations by use of oscillator 134. Oscillator 134 represents an oscillator circuit, such as a ring oscillator, in memory device 130 to generate drift information for CA 122. In one example, oscillator 134 represents a ring oscillator specific to the command bus.

Each memory device 130 can provide drift information from the memory devices to memory controller 116. The drift information can indicate how temperature changes shifts the command and address information on CA 122 relative to the clock edges of clock 124. In one example, oscillator 134 runs as a background process. In one example, oscillator 134 runs in conjunction with a ZQ background routine. In one example, with register 136, host 110 can poll for the oscillator information.

It will be understood that while data bus 126 is a point-to-point bus, providing a unique group of signal lines between memory controller 116 and each memory device 130, command bus 122 is a multidrop bus, providing shared signal lines from memory controller 116 to all memory devices 130. Thus, while drift feedback information can be provided for individual memory devices, memory controller 116 can process drift feedback information from multiple memory devices or all memory devices and determine how to adjust command bus IO settings based on one or multiple memory devices.

In one example, memory device 130 includes register 136 to store the output from oscillator 134. In one example, register 136 represents a mode register. In one example, register 136 represents a multipurpose register. With register 136, oscillator 134 can run periodically, memory device 130 can store a value in register 136, and the memory device can then send the value to host 110. The running of oscillator 134 can measure an amount of delay for the command bus over a time interval. Data bus 126 passes a value back to host 110 based on the amount of delay measured by oscillator 134, either as a value generated by oscillator 134, or as a value determined based on the output of oscillator 134.

In one example, oscillator 134 provides a dummy clock tree oscillator that can be run to get an average delay change due to temperature. Memory device 130 can manage operation of oscillator 134 without specific control by host 110. Host 110 provides clock 124 for command bus 122, which memory device 130 can use to track the drift with oscillator 134. In one example, oscillator 134 generates a count, which it stores in register 136. Based on the count in register 136, host 110 can update the transmit settings for the command IO to compensate for the updated drift skew determined from the oscillator information.

In one example, memory device 130 provides the oscillator information over data bus 126. In one example, system 100 includes a unidirectional feedback line from memory 120 to host 110, and memory device 130 provides the oscillator information over the feedback line. In one example, system 100 includes a bidirectional control line from memory 120 to host 110, and memory device 130 provides the oscillator information over the control line. Thus, memory device 130 can provide the drift information over an existing signal line, which prevents the need to add a signal line for such feedback. In one example, system 100 can add one or more signal lines to provide the drift information. In one example, system 100 enables passing feedback for an unmatched CA bus while maintaining a lower pincount CA bus with improved power management.

It will be understood that if the command interface drifts during a low power state, such as power down or self-refresh, there will be a mismatch between the signal information and the clock, leading to command signaling errors. In one example, memory device 130 includes logic 140 to control the output of oscillator 134 to host 110. In one example, as part of an exit from a low power state, memory device 130 provides oscillator information to host 110, to enable memory controller 116 to determine how to adjust command bus IO settings. As illustrated, logic 140 has low power exit 142 as an input to control the output of oscillator 134. In addition to providing drift information with low power exit, in one example, memory controller 116 can poll memory device 130 for the command bus drift information. As illustrated, logic 140 has poll 144 as an input to control the output of oscillator 134.

In one example, memory device 130 runs an operation with oscillator 134 periodically and updates the value in register 136. Memory device 130 can update the value in register 136 more frequently than the value is passed to host 110. In one example, memory device 130 receives a polling request from memory controller 116 for contents of register 136 during runtime of the memory. Runtime refers to the time memory 120 is active, as opposed to when a memory device is in a low power state.

In one example, memory device 130 automatically provides the drift information upon exit from a low power state. In one example, memory device 130 provides the drift information over data bus 126 at a frequency slower than a normal operating frequency. The frequency of communication refers to the time between sampling edges of the clock or strobe.

In one example, memory device 130 automatically drives the value to host 110 over data bus 126 in a low frequency communication mode upon exit from a low power state. Host 110 typically triggers the exit from the low power state with a power down exit (PDX) or a self refresh exit (SRX) command. After providing such a command, host 110 can know to expect communication on data bus 126 in a low frequency mode. The use of a lower frequency allows less precision in the communication without significantly increasing the error rate when communicating the drift information. The lower frequency mode can be ¼ frequency communication, ⅛ frequency, or some other frequency.

Poll 144 can represent host 110 reading register 136 for normal runtime operation. Low power exit 142 can represent memory device 130 automatically driving the value of register 136 to host 110 for exit from a low power state.

Figure 2:
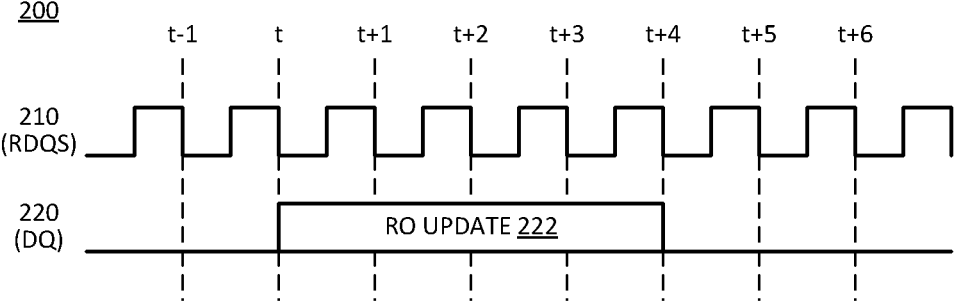
FIG. 2 is a timing diagram of an example of sending command bus drift feedback on the data bus.

FIG. 2 is a timing diagram of an example of sending command bus drift feedback on the data bus. Diagram 200 provides an example of timing for sending a ring oscillator (RO) value or other command bus drift feedback value. Diagram 200 represents a timing diagram for an example of system 100.

Diagram illustrates signal 210 as a read data strobe (RDQS) and signal 220 as a data (DQ). Signal 210 represents a clock signal for the exchange of data. Signal 210 is the read data strobe because the memory device drives the strobe as opposed to receiving a strobe driven by the host for write data. Signal 210 has various time markers indicating the falling edge of the strobe signal, from time t−1 to time t+6.

Signal 220 represents drift update information sent from the memory device to the memory controller on the data bus. RO update 222 represents a value sent to the host with drift information. For point of reference, RO update 222 is illustrated spanning the falling edge labeled as time t, to time t+4. From the perspective of falling edges, RO update 222 can be considered as ¼-frequency communication, covering 4 clocks. From the perspective that the data bus can be operated as double data rate, sending data on consecutive falling edges and rising edges of the strobe signal, RO update 222 can be considered a ⅛-frequency communication. The frequency can be referenced by the number of cycles, identified as an M-cycle communication, where M is an integer.

The frequency of RO update 222 is merely exemplary, and a different communication frequency can be used. In one example, the memory device sends RO update 222 automatically during a power down exit or a self-refresh exit operation. In one example, the memory device sends RO update 222 as a single block of data. In one example, the memory device sends RO update 222 as multiple blocks of data.

Figure 3:
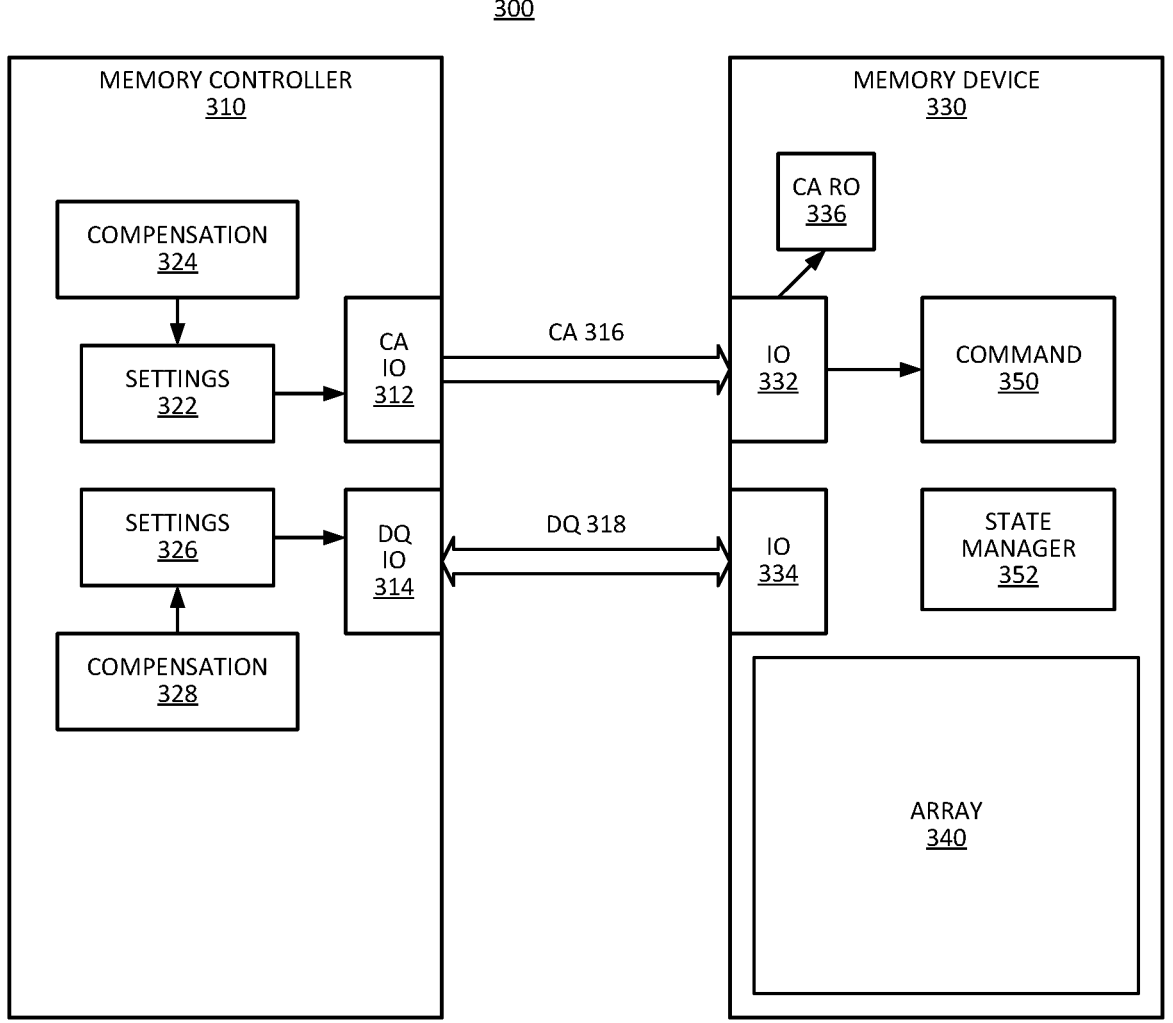
FIG. 3 is a block diagram of an example of a system in which a memory controller adjusts command bus I/O settings based on feedback from a command bus oscillator on the memory device.

FIG. 3 is a block diagram of an example of a system in which a memory controller adjusts command bus I/O settings based on feedback from a command bus oscillator on the memory device. System 300 represents memory controller 310 coupled to memory device 330. System 300 illustrates a memory system in accordance with an example of system 100.

Memory controller 310 represents an integrated memory controller (iMC) or a discrete memory controller in a computer system. Memory controller 310 manages access to memory device 330. Memory controller 310 generates and sends commands to memory device 330, to trigger data operations (such as read and write) and manage state of the memory device. Memory device 330 can be a single device package or a multi-device or a multi-die package. Memory device 330 includes array 340 to store data.

Memory controller 310 includes command and address input/output (CA IO) 312 to couple to input/output (IO) 332 of memory device 330. The connection between CA IO 312 and IO 332 represents unidirectional command and address bus (CA) 316. The unidirectional CA bus has unidirectional links to memory device 330. CA 316 enables memory controller to send commands to memory device 330. Memory controller 310 has settings 322 to control the operation of CA IO 312. Settings 322 represent configuration parameters that control drivers, timing, and electrical parameters of the command bus IO.

Memory controller 310 includes data input/output (DQ IO) 314 to couple to input/output (IO) 334 of memory device 330. The connection between DQ IO 314 and IO 334 represents bidirectional data bus (DQ) 318. The bidirectional data bus has bidirectional links between memory device 330 and memory controller 310. DQ 318 enables memory controller to send data for write commands and to receive data for read commands. Memory controller 310 has settings 326 to control the operation of DQ IO 314. Settings 326 represent configuration parameters that control transceivers, timing, and electrical parameters of the data bus IO.

In one example, memory device 330 includes command 350, which represents command logic or logic within the memory device to decode commands received from memory controller 310. For commands related to states of memory device 330, state manager 352 manages the state of the device in accordance with the command. In one example, state manager 352 controls the operation of memory device 330 in self-refresh and low power states.

In one example, memory device 330 includes command and address ring oscillator (CA RO) 336 to generate information about drift for the command bus. State manager 352 represents logic to manage the exit of memory device 330 from the low power state. In one example, as part of exit from the low power state, state manager 352 sends the information about drift generated by CA RO 336 over data bus DQ 318.

Based on the value that memory device 330 provides to memory controller 310, memory controller 310 can determine how much compensation to provide for CA IO 312 to adjust for drift based on the value. Compensation 324 represents the compensation computed by memory controller 310. Memory controller 310 can adjust a communication setting (e.g., settings 322) for CA IO 312 to drive CA 316 based on the value received from memory device 330.

In one example, system 300 includes a DQ oscillator (not shown) in memory device 330. Based on feedback for DQ 318, memory controller 310 can determine how much compensation to provide for DQ IO 314. Compensation 328 represents the compensation computed by memory controller 310. It will be understood that the operation of CA RO 336 can be separate from an oscillator for the DQ bus, and memory controller 310 can separately determine compensation for the CA and DQ channels. Thus, the delay shift can be determined separately and in parallel for CA 316 and DQ 318.

Figure 4:
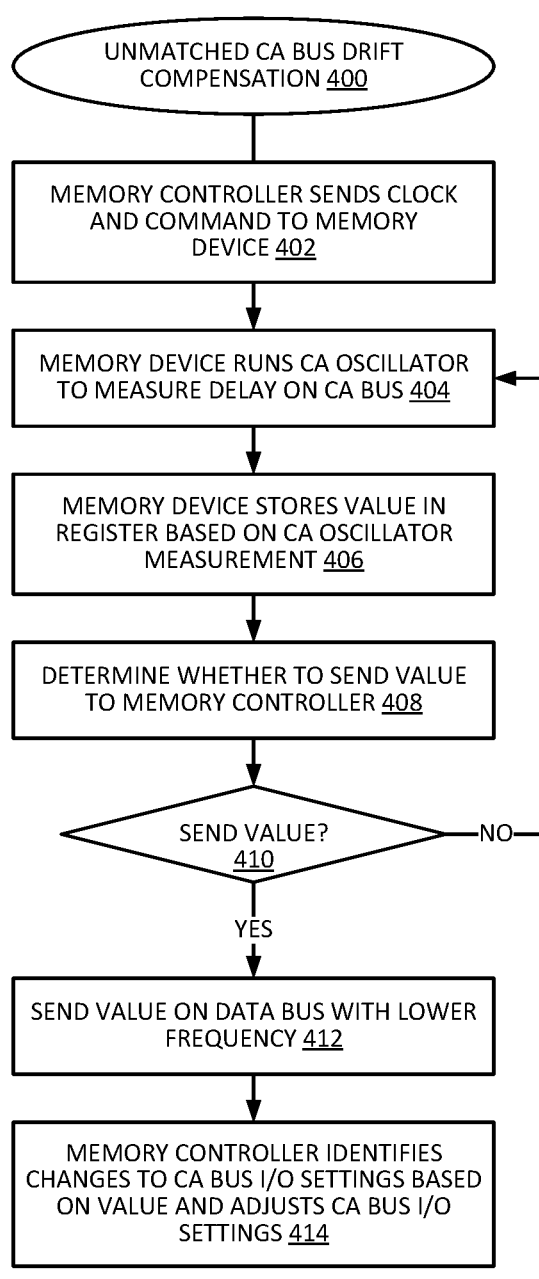
FIG. 4 is a flow diagram of an example of a process for command bus drift compensation.

FIG. 4 is a flow diagram of an example of a process for command bus drift compensation. Process 400 provides compensation for CA bus drift for an unmatched CA bus. Process 400 can be performed by a system in accordance with an example of system 100 or an example of system 300.

The memory controller sends a clock signal and a command to a memory device, at 402. In one example, the memory device runs a CA oscillator to measure delay on the CA bus, at 404. The delay on the CA bus can represent a phase offset between the command signals and the clock signal. The memory device can run the CA oscillator to measure delay for a time interval.

In one example, the memory device stores a value in a register based on the CA oscillator measurement, at 406. The host can be configured to receive and properly interpret how the value corresponds to delay in the CA bus. The host can use the value to determine how to adjust settings for driving commands on the command bus.

In one example, the memory device does not always send the CA oscillator value to the host. Thus, the memory device can determine whether to send the value to the memory controller, at 408. If the memory device determines not to send the value, at 410 NO branch, the memory device can repeat running the oscillator and storing the value.

When the memory device determines to send the value, at 410 YES branch, the memory device can send the value on the data bus with a lower frequency than the normal operating frequency of the data bus, at 412. The lower frequency is a frequency slower than a runtime bitrate on the data bus when the memory controller and memory device exchange data. In one example, the memory device sends the value at the normal bitrate on the data bus in response to a polling request from the memory controller. In one example, the memory device uses the lower frequency communication upon exit from a low power state. The memory controller can then identify changes to the CA bus settings based on the value and adjust CA bus I/O settings based on the identified changes, at 414.

Figure 5:
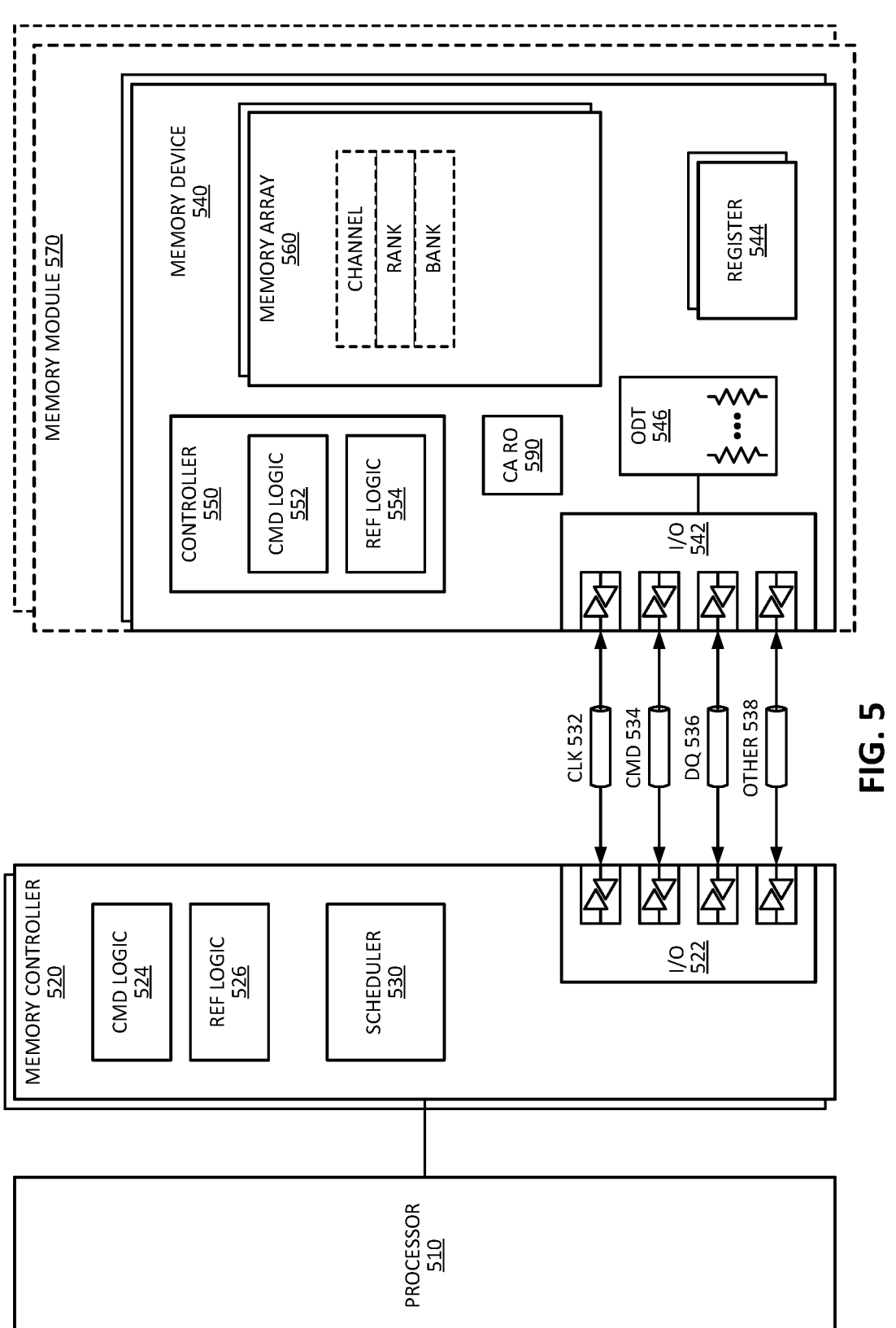
FIG. 5 is a block diagram of an example of a memory subsystem in which command bus drift compensation can be implemented.

FIG. 5 is a block diagram of an example of a memory subsystem in which command bus drift compensation can be implemented. System 500 includes a processor and elements of a memory subsystem in a computing device. System 500 represents a system with a memory subsystem in accordance with an example of system 100 or an example of system 300.

In one example, memory device 540 includes command and address ring oscillator (CA RO) 590, which represents an oscillator in the memory device to measure drift on the command bus. The measurement of the drift can be in accordance with any example herein. Memory device 540 can return a value to memory controller 520 to identify the drift information to the memory controller. The returning of the value can be in accordance with any example herein. In one example, memory controller 520 makes a request for drift information and memory device 540 can return the value at a normal communication frequency. In one example, memory device 540 automatically returns the value in conjunction with an exit from a low power state at a slower communication frequency.

Processor 510 represents a processing unit of a computing platform that may execute an operating system (OS) and applications, which can collectively be referred to as the host or the user of the memory. The OS and applications execute operations that result in memory accesses. Processor 510 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 500 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random-access memory), or some variant such as synchronous DRAM (SDRAM). A memory subsystem as described herein may be compatible with a number of memory technologies, such as DDR4 (double data rate version 4, JESD79-4, originally published in September 2012 by JEDEC (Joint Electron Device Engineering Council, now the JEDEC Solid State Technology Association), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, originally published by JEDEC in July 2020), LPDDR5 (LPDDR version 5, JESD209-5, originally published by JEDEC in February 2019), HBM2 (HBM version 2, JESD235C, originally published by JEDEC in January 2020), HBM3 (HBM version 3, JESD238, originally published by JEDEC in January 2022), or others or combinations of memory technologies, and technologies based on derivatives or extensions of such specifications.

Memory controller 520 represents one or more memory controller circuits or devices for system 500. In one example, memory controller 520 is on the same semiconductor substrate as processor 510. Memory controller 520 represents control logic that generates memory access commands in response to the execution of operations by processor 510. Memory controller 520 accesses one or more memory devices 540. Memory devices 540 can be DRAM devices in accordance with any referred to above. In one example, memory devices 540 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 520 manages a separate memory channel, although system 500 can be configured to have multiple channels managed by a single controller, or to have multiple controllers on a single channel. In one example, memory controller 520 is part of host processor 510, such as logic implemented on the same die or implemented in the same package space as the processor.

Memory controller 520 includes I/O interface logic 522 to couple to a memory bus, such as a memory channel as referred to above. I/O interface logic 522 (as well as I/O interface logic 542 of memory device 540) can include pins, pads, connectors, signal lines, traces, or wires, or other hardware to connect the devices, or a combination of these. I/O interface logic 522 can include a hardware interface. As illustrated, I/O interface logic 522 includes at least drivers/transceivers for signal lines. Commonly, wires within an integrated circuit interface couple with a pad, pin, or connector to interface signal lines or traces or other wires between devices. I/O interface logic 522 can include drivers, receivers, transceivers, or termination, or other circuitry or combinations of circuitry to exchange signals on the signal lines between the devices. The exchange of signals includes at least one of transmit or receive. While shown as coupling I/O 522 from memory controller 520 to I/O 542 of memory device 540, it will be understood that in an implementation of system 500 where groups of memory devices 540 are accessed in parallel, multiple memory devices can include I/O interfaces to the same interface of memory controller 520. In an implementation of system 500 including one or more memory modules 570, I/O 542 can include interface hardware of the memory module in addition to interface hardware on the memory device itself. Other memory controllers 520 will include separate interfaces to other memory devices 540.

The bus between memory controller 520 and memory devices 540 can be implemented as multiple signal lines coupling memory controller 520 to memory devices 540. The bus may typically include at least clock (CLK) 532, command/address (CMD) 534, data (DQ) 536, and zero or more other signal lines 538. In one example, a bus or connection between memory controller 520 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 500 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 520 and memory devices 540. An example of a serial bus technology is 8B10B encoding and transmission of high-speed data with embedded clock over a single differential pair of signals in each direction. In one example, CMD 534 represents signal lines shared in parallel with multiple memory devices. In one example, multiple memory devices share encoding command signal lines of CMD 534, and each has a separate chip select (CS_n) signal line to select individual memory devices.

It will be understood that in the example of system 500, the bus between memory controller 520 and memory devices 540 includes a subsidiary command bus CMD 534 and a subsidiary bus to carry the write and read data, DQ 536. In one example, the data bus can include bidirectional lines for read data and for write/command data. In another example, the subsidiary bus DQ 536 can include unidirectional write signal lines for write and data from the host to memory, and can include unidirectional lines for read data from the memory to the host. In accordance with the chosen memory technology and system design, other signals 538 may accompany a bus or sub bus, such as strobe lines DQS. Based on design of system 500, or implementation if a design supports multiple implementations, the data bus can have more or less bandwidth per memory device 540. For example, the data bus can support memory devices that have either a ×4 interface, a ×8 interface, a ×16 interface, or other interface. The convention "xW," where W is an integer that refers to an interface size or width of the interface of memory device 540, which represents a number of signal lines to exchange data with memory controller 520. The interface size of the memory devices is a controlling factor on how many memory devices can be used concurrently per channel in system 500 or coupled in parallel to the same signal lines. In one example, high bandwidth memory devices, wide interface devices, or stacked memory configurations, or combinations, can enable wider interfaces, such as a ×128 interface, a ×256 interface, a ×512 interface, a ×1024 interface, or other data bus interface width.

In one example, memory devices 540 and memory controller 520 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length eight (BL8), and each memory device 540 can transfer data on each UI. Thus, a ×8 memory device operating on BL8 can transfer 64 bits of data (8 data signal lines times 8 data bits transferred per line over the burst). It will be understood that this simple example is merely an illustration and is not limiting.

Memory devices 540 represent memory resources for system 500. In one example, each memory device 540 is a separate memory die. In one example, each memory device 540 can interface with multiple (e.g., 2) channels per device or die. Each memory device 540 includes I/O interface logic 542, which has a bandwidth determined by the implementation of the device (e.g., ×16 or ×8 or some other interface bandwidth). I/O interface logic 542 enables the memory devices to interface with memory controller 520. I/O interface logic 542 can include a hardware interface, and can be in accordance with I/O 522 of memory controller, but at the memory device end. In one example, multiple memory devices 540 are connected in parallel to the same command and data buses. In another example, multiple memory devices 540 are connected in parallel to the same command bus, and are connected to different data buses. For example, system 500 can be configured with multiple memory devices 540 coupled in parallel, with each memory device responding to a command, and accessing memory resources 560 internal to each. For a Write operation, an individual memory device 540 can write a portion of the overall data word, and for a Read operation, an individual memory device 540 can fetch a portion of the overall data word. The remaining bits of the word will be provided or received by other memory devices in parallel.

In one example, memory devices 540 are disposed directly on a motherboard or host system platform (e.g., a PCB (printed circuit board) or substrate on which processor 510 is disposed) of a computing device. In one example, memory devices 540 can be organized into memory modules 570. In one example, memory modules 570 represent dual inline memory modules (DIMMs). In one example, memory modules 570 represent other organization of multiple memory devices to share at least a portion of access or control circuitry, which can be a separate circuit, a separate device, or a separate board from the host system platform. Memory modules 570 can include multiple memory devices 540, and the memory modules can include support for multiple separate channels to the included memory devices disposed on them. In another example, memory devices 540 may be incorporated into the same package as memory controller 520, such as by techniques such as multi-chip-module (MCM), package-on-package, through-silicon via (TSV), or other techniques or combinations. Similarly, in one example, multiple memory devices 540 may be incorporated into memory modules 570, which themselves may be incorporated into the same package as memory controller 520. It will be appreciated that for these and other implementations, memory controller 520 may be part of host processor 510.

Memory devices 540 each include one or more memory arrays 560. Memory array 560 represents addressable memory locations or storage locations for data. Typically, memory array 560 is managed as rows of data, accessed via wordline (rows) and bitline (individual bits within a row) control. Memory array 560 can be organized as separate channels, ranks, and banks of memory. Channels may refer to independent control paths to storage locations within memory devices 540. Ranks may refer to common locations across multiple memory devices (e.g., same row addresses within different devices) in parallel. Banks may refer to sub-arrays of memory locations within a memory device 540. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 540 include one or more registers 544. Register 544 represents one or more storage devices or storage locations that provide configuration or settings for the operation of the memory device. In one example, register 544 can provide a storage location for memory device 540 to store data for access by memory controller 520 as part of a control or management operation. In one example, register 544 includes one or more Mode Registers. In one example, register 544 includes one or more multipurpose registers. The configuration of locations within register 544 can configure memory device 540 to operate in different "modes," where command information can trigger different operations within memory device 540 based on the mode. Additionally or in the alternative, different modes can also trigger different operation from address information or other signal lines depending on the mode. Settings of register 544 can indicate configuration for I/O settings (e.g., timing, termination or ODT (on-die termination) 546, driver configuration, or other I/O settings).

In one example, memory device 540 includes ODT 546 as part of the interface hardware associated with I/O 542. ODT 546 can be configured as mentioned above, and provide settings for impedance to be applied to the interface to specified signal lines. In one example, ODT 546 is applied to DQ signal lines. In one example, ODT 546 is applied to command signal lines. In one example, ODT 546 is applied to address signal lines. In one example, ODT 546 can be applied to any combination of the preceding. The ODT settings can be changed based on whether a memory device is a selected target of an access operation or a non-target device. ODT 546 settings can affect the timing and reflections of signaling on the terminated lines. Careful control over ODT 546 can enable higher-speed operation with improved matching of applied impedance and loading. ODT 546 can be applied to specific signal lines of I/O interface 542, 522 (for example, ODT for DQ lines or ODT for CA lines), and is not necessarily applied to all signal lines.

Memory device 540 includes controller 550, which represents control logic within the memory device to control internal operations within the memory device. For example, controller 550 decodes commands sent by memory controller 520 and generates internal operations to execute or satisfy the commands. Controller 550 can be referred to as an internal controller, and is separate from memory controller 520 of the host. Controller 550 can determine what mode is selected based on register 544, and configure the internal execution of operations for access to memory resources 560 or other operations based on the selected mode. Controller 550 generates control signals to control the routing of bits within memory device 540 to provide a proper interface for the selected mode and direct a command to the proper memory locations or addresses. Controller 550 includes command logic 552, which can decode command encoding received on command and address signal lines. Thus, command logic 552 can be or include a command decoder. With command logic 552, memory device can identify commands and generate internal operations to execute requested commands.

Referring again to memory controller 520, memory controller 520 includes command (CMD) logic 524, which represents logic or circuitry to generate commands to send to memory devices 540. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 540, memory controller 520 can issue commands via I/O 522 to cause memory device 540 to execute the commands. In one example, controller 550 of memory device 540 receives and decodes command and address information received via I/O 542 from memory controller 520. Based on the received command and address information, controller 550 can control the timing of operations of the logic and circuitry within memory device 540 to execute the commands. Controller 550 is responsible for compliance with standards or specifications within memory device 540, such as timing and signaling requirements. Memory controller 520 can implement compliance with standards or specifications by access scheduling and control.

Memory controller 520 includes scheduler 530, which represents logic or circuitry to generate and order transactions to send to memory device 540. From one perspective, the primary function of memory controller 520 could be said to schedule memory access and other transactions to memory device 540. Such scheduling can include generating the transactions themselves to implement the requests for data by processor 510 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 520 typically includes logic such as scheduler 530 to allow selection and ordering of transactions to improve performance of system 500. Thus, memory controller 520 can select which of the outstanding transactions should be sent to memory device 540 in which order, which is typically achieved with logic much more complex that a simple first-in first-out algorithm. Memory controller 520 manages the transmission of the transactions to memory device 540, and manages the timing associated with the transaction. In one example, transactions have deterministic timing, which can be managed by memory controller 520 and used in determining how to schedule the transactions with scheduler 530.

In one example, memory controller 520 includes refresh (REF) logic 526. Refresh logic 526 can be used for memory resources that are volatile and need to be refreshed to retain a deterministic state. In one example, refresh logic 526 indicates a location for refresh, and a type of refresh to perform. Refresh logic 526 can trigger self-refresh within memory device 540, or execute external refreshes which can be referred to as auto refresh commands) by sending refresh commands, or a combination. In one example, controller 550 within memory device 540 includes refresh logic 554 to apply refresh within memory device 540. In one example, refresh logic 554 generates internal operations to perform refresh in accordance with an external refresh received from memory controller 520. Refresh logic 554 can determine if a refresh is directed to memory device 540, and what memory resources 560 to refresh in response to the command.

Figure 6:
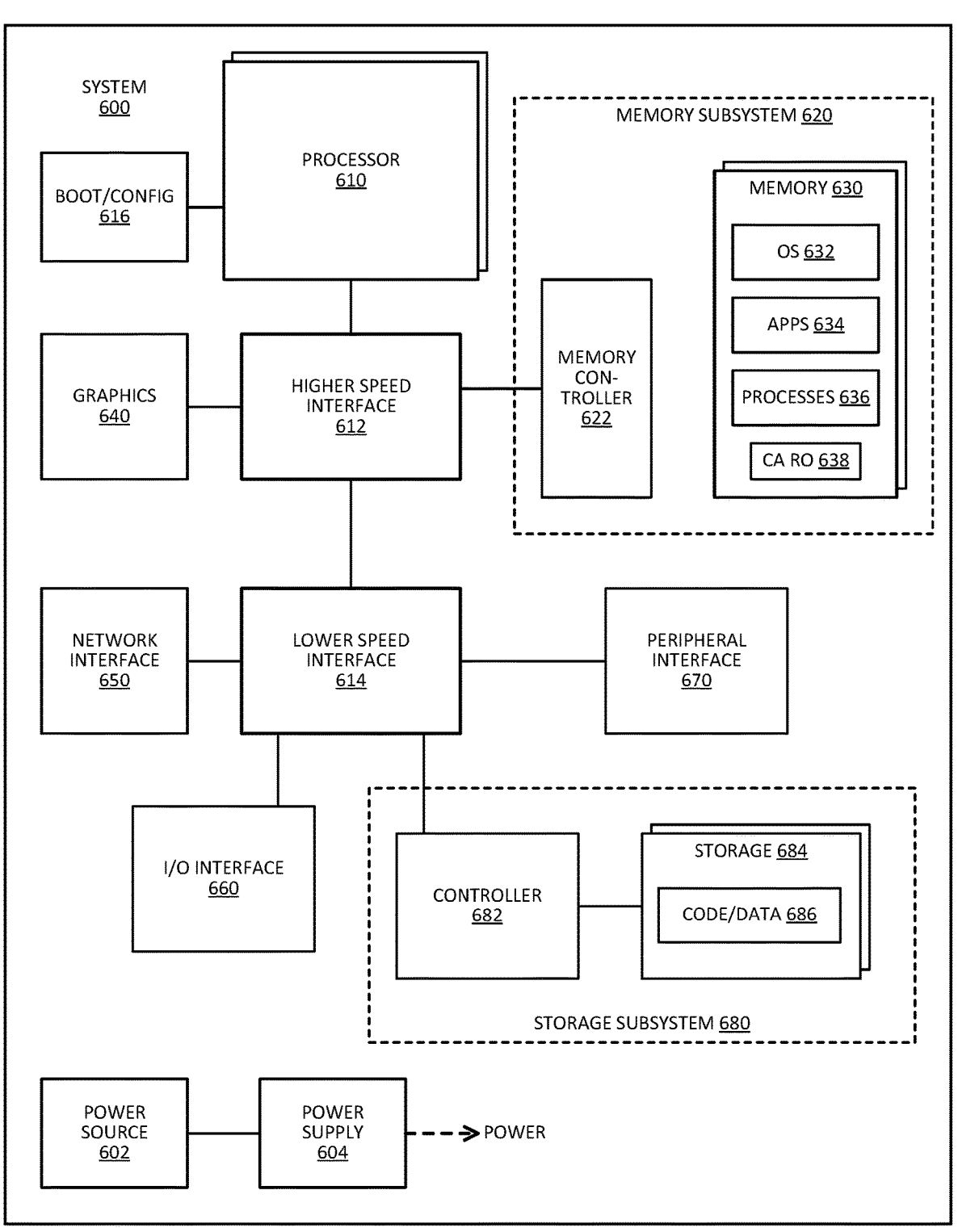
FIG. 6 is a block diagram of an example of a computing system in which command bus drift compensation can be implemented.

FIG. 6 is a block diagram of an example of a computing system in which command bus drift compensation can be implemented. System 600 represents a computing device in accordance with any example herein, and can be a laptop computer, a desktop computer, a tablet computer, a server, a gaming or entertainment control system, embedded computing device, or other electronic device. System 600 represents a system with a memory subsystem in accordance with an example of system 100 or an example of system 300.

In one example, memory 630 includes command and address ring oscillator (CA RO) 638, which represents an oscillator in the memory device to measure drift on the command bus. The measurement of the drift can be in accordance with any example herein. Memory 630 can return a value to memory controller 622 to identify the drift information to the memory controller. The returning of the value can be in accordance with any example herein. In one example, memory controller 622 makes a request for drift information and memory 630 can return the value at a normal communication frequency. In one example, memory 630 automatically returns the value in conjunction with an exit from a low power state at a slower communication frequency.

System 600 includes processor 610 can include any type of microprocessor, central processing unit (CPU), graphics processing unit (GPU), processing core, or other processing hardware, processor device, or a combination, to provide processing or execution of instructions for system 600. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or a combination of such devices. Processor 610 can be considered a host processor device for system 600.

System 600 includes boot/config 616, which represents storage to store boot code (e.g., basic input/output system (BIOS)), configuration settings, security hardware (e.g., trusted platform module (TPM)), or other system level hardware that operates outside of a host OS. Boot/config 616 can include a nonvolatile storage device, such as read-only memory (ROM), flash memory, or other memory devices.

In one example, system 600 includes interface 612 coupled to processor 610, which can represent a higher speed interface or a high throughput interface for system components that need higher bandwidth connections, such as memory subsystem 620 or graphics interface components 640. Interface 612 represents an interface circuit, which can be a standalone component or integrated onto a processor die. Interface 612 can be integrated as a circuit onto the processor die or integrated as a component on a system on a chip. Where present, graphics interface 640 interfaces to graphics components for providing a visual display to a user of system 600. Graphics interface 640 can be a standalone component or integrated onto the processor die or system on a chip. In one example, graphics interface 640 can drive a high definition (HD) display or ultra high definition (UHD) display that provides an output to a user. In one example, the display can include a touchscreen display. In one example, graphics interface 640 generates a display based on data stored in memory 630 or based on operations executed by processor 610 or both.

Memory subsystem 620 represents the main memory of system 600, and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, 3DXP (three-dimensional crosspoint), or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610, such as integrated onto the processor die or a system on a chip.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 600 includes interface 614, which can be coupled to interface 612. Interface 614 can be a lower speed interface than interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can exchange data with a remote device, which can include sending data stored in memory or receiving data to be stored in memory.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, 3DXP, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610, or can include circuits or logic in both processor 610 and interface 614.

Power source 602 provides power to the components of system 600. More specifically, power source 602 typically interfaces to one or multiple power supplies 604 in system 600 to provide power to the components of system 600. In one example, power supply 604 includes an AC to DC (alternating current to direct current) adapter to plug into a wall outlet. Such AC power can be renewable energy (e.g., solar power) power source 602. In one example, power source 602 includes a DC power source, such as an external AC to DC converter. In one example, power source 602 or power supply 604 includes wireless charging hardware to charge via proximity to a charging field. In one example, power source 602 can include an internal battery or fuel cell source.

Figure 7:
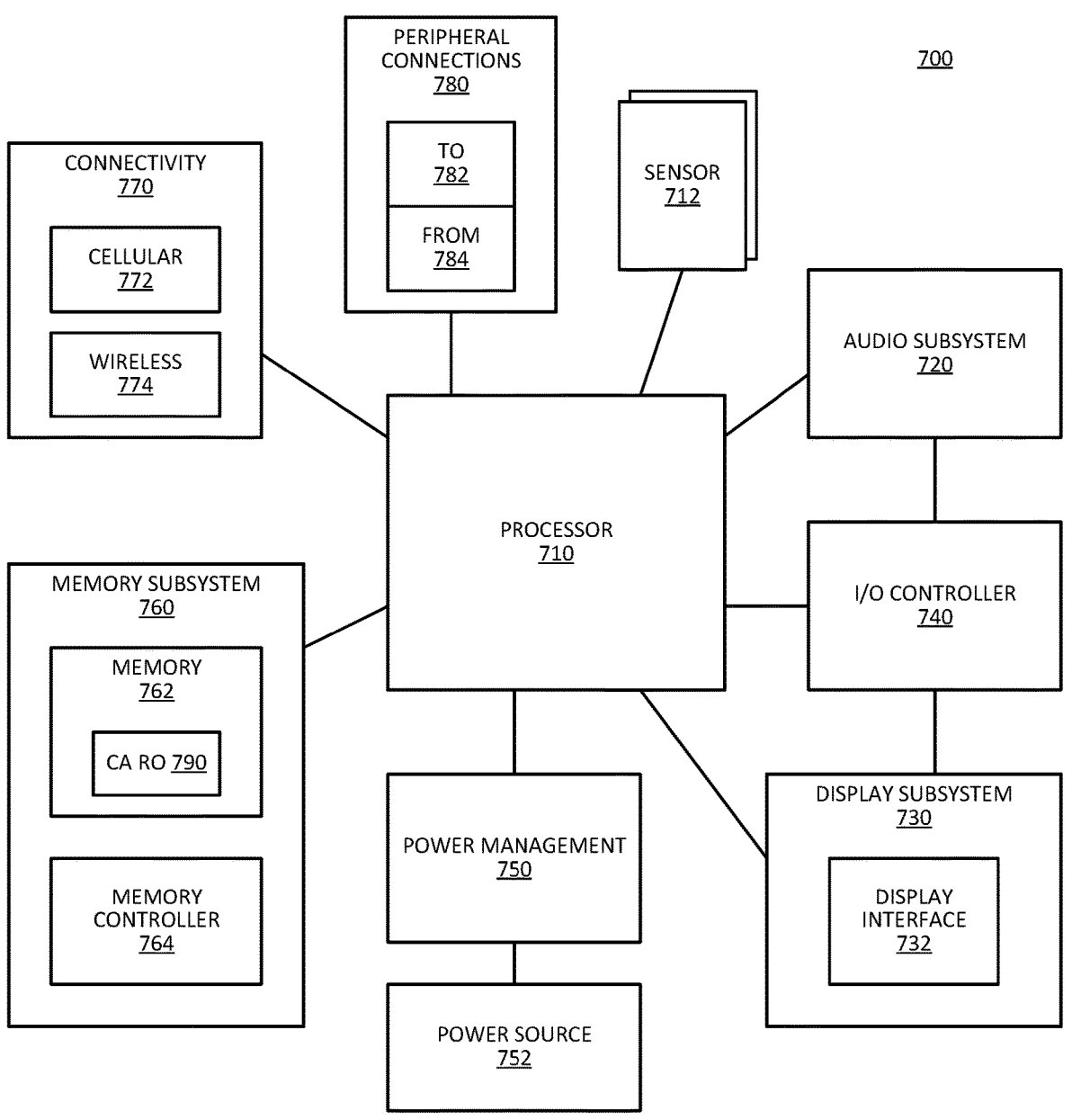
FIG. 7 is a block diagram of an example of a mobile device in which command bus drift compensation can be implemented.

FIG. 7 is a block diagram of an example of a mobile device in which command bus drift compensation can be implemented. System 700 represents a mobile computing device, such as a computing tablet, a mobile phone or smartphone, wearable computing device, or other mobile device, or an embedded computing device. It will be understood that certain of the components are shown generally, and not all components of such a device are shown in system 700. System 700 can be or include a system in accordance with an example of system 100 or an example of system 300.

In one example, memory 762 includes command and address ring oscillator (CA RO) 790, which represents an oscillator in the memory device to measure drift on the command bus. The measurement of the drift can be in accordance with any example herein. Memory 762 can return a value to memory controller 764 to identify the drift information to the memory controller. The returning of the value can be in accordance with any example herein. In one example, memory controller 764 makes a request for drift information and memory 762 can return the value at a normal communication frequency. In one example, memory 762 automatically returns the value in conjunction with an exit from a low power state at a slower communication frequency.

System 700 includes processor 710, which performs the primary processing operations of system 700. Processor 710 can include one or more physical devices, such as micro-processors, application processors, microcontrollers, pro-grammable logic devices, or other processing means or processor devices. Processor 710 can be considered a host processor device for system 700. The processing operations performed by processor 710 include the execution of an operating platform or operating system on which applica-tions and device functions are executed. The processing operations include operations related to I/O (input/output) with a human user or with other devices, operations related to power management, operations related to connecting system 700 to another device, or a combination. The pro-cessing operations can also include operations related to audio I/O, display I/O, or other interfacing, or a combina-tion. Processor 710 can execute data stored in memory. Processor 710 can write or edit data stored in memory.

In one example, system 700 includes one or more sensors 712. Sensors 712 represent embedded sensors or interfaces to external sensors, or a combination. Sensors 712 enable system 700 to monitor or detect one or more conditions of an environment or a device in which system 700 is imple-mented. Sensors 712 can include environmental sensors (such as temperature sensors, motion detectors, light detec-tors, cameras, chemical sensors (e.g., carbon monoxide, carbon dioxide, or other chemical sensors)), pressure sen-sors, accelerometers, gyroscopes, medical or physiology sensors (e.g., biosensors, heart rate monitors, or other sen-sors to detect physiological attributes), or other sensors, or a combination. Sensors 712 can also include sensors for biometric systems such as fingerprint recognition systems, face detection or recognition systems, or other systems that detect or recognize user features. Sensors 712 should be understood broadly, and not limiting on the many different types of sensors that could be implemented with system 700. In one example, one or more sensors 712 couples to pro-cessor 710 via a frontend circuit integrated with processor 710. In one example, one or more sensors 712 couples to processor 710 via another component of system 700.

In one example, system 700 includes audio subsystem 720, which represents hardware (e.g., audio hardware and audio circuits) and software (e.g., drivers, codecs) compo-nents associated with providing audio functions to the computing device. Audio functions can include speaker or headphone output, as well as microphone input. Devices for such functions can be integrated into system 700, or con-nected to system 700. In one example, a user interacts with system 700 by providing audio commands that are received and processed by processor 710.

Display subsystem 730 represents hardware (e.g., display devices) and software components (e.g., drivers) that pro-vide a visual display for presentation to a user. In one example, the display includes tactile components or touch-screen elements for a user to interact with the computing device. Display subsystem 730 includes display interface 732, which includes the particular screen or hardware device used to provide a display to a user. In one example, display interface 732 includes logic separate from processor 710 (such as a graphics processor) to perform at least some processing related to the display. In one example, display subsystem 730 includes a touchscreen device that provides both output and input to a user. In one example, display subsystem 730 includes a high definition (HD) or ultra-high definition (UHD) display that provides an output to a user. In one example, display subsystem includes or drives a touchscreen display. In one example, display subsystem 730 generates display information based on data stored in memory or based on operations executed by processor 710 or both.

I/O controller 740 represents hardware devices and soft-ware components related to interaction with a user. I/O controller 740 can operate to manage hardware that is part of audio subsystem 720, or display subsystem 730, or both. Additionally, I/O controller 740 illustrates a connection point for additional devices that connect to system 700 through which a user might interact with the system. For example, devices that can be attached to system 700 might include microphone devices, speaker or stereo systems, video systems or other display device, keyboard or keypad devices, buttons/switches, or other I/O devices for use with specific applications such as card readers or other devices.

As mentioned above, I/O controller 740 can interact with audio subsystem 720 or display subsystem 730 or both. For example, input through a microphone or other audio device can provide input or commands for one or more applications or functions of system 700. Additionally, audio output can be provided instead of or in addition to display output. In another example, if display subsystem includes a touch-screen, the display device also acts as an input device, which can be at least partially managed by I/O controller 740. There can also be additional buttons or switches on system 700 to provide I/O functions managed by I/O controller 740.

In one example, I/O controller 740 manages devices such as accelerometers, cameras, light sensors or other environ-mental sensors, gyroscopes, global positioning system (GPS), or other hardware that can be included in system 700, or sensors 712. The input can be part of direct user inter-action, as well as providing environmental input to the system to influence its operations (such as filtering for noise, adjusting displays for brightness detection, applying a flash for a camera, or other features).

In one example, system 700 includes power management 750 that manages battery power usage, charging of the battery, and features related to power saving operation. Power management 750 manages power from power source 752, which provides power to the components of system 700. In one example, power source 752 includes an AC to DC (alternating current to direct current) adapter to plug into a wall outlet. Such AC power can be renewable energy (e.g., solar power, motion based power). In one example, power source 752 includes only DC power, which can be provided by a DC power source, such as an external AC to DC converter. In one example, power source 752 includes wireless charging hardware to charge via proximity to a charging field. In one example, power source 752 can include an internal battery or fuel cell source.

Memory subsystem 760 includes memory device(s) 762 for storing information in system 700. Memory subsystem 760 can include nonvolatile (state does not change if power to the memory device is interrupted) or volatile (state is indeterminate if power to the memory device is interrupted) memory devices, or a combination. Memory 760 can store application data, user data, music, photos, documents, or other data, as well as system data (whether long-term or temporary) related to the execution of the applications and functions of system 700. In one example, memory subsystem 760 includes memory controller 764 (which could also be considered part of the control of system 700, and could potentially be considered part of processor 710). Memory controller 764 includes a scheduler to generate and issue commands to control access to memory device 762.

Connectivity 770 includes hardware devices (e.g., wireless or wired connectors and communication hardware, or a combination of wired and wireless hardware) and software components (e.g., drivers, protocol stacks) to enable system 700 to communicate with external devices. The external device could be separate devices, such as other computing devices, wireless access points or base stations, as well as peripherals such as headsets, printers, or other devices. In one example, system 700 exchanges data with an external device for storage in memory or for display on a display device. The exchanged data can include data to be stored in memory, or data already stored in memory, to read, write, or edit data.

Connectivity 770 can include multiple different types of connectivity. To generalize, system 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), 5G, or other cellular service standards. Wireless connectivity 774 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 780 include hardware interfaces and connectors, as well as software components (e.g., drivers, protocol stacks) to make peripheral connections. It will be understood that system 700 could both be a peripheral device ("to" 782) to other computing devices, as well as have peripheral devices ("from" 784) connected to it. System 700 commonly has a "docking" connector to connect to other computing devices for purposes such as managing (e.g., downloading, uploading, changing, synchronizing) content on system 700. Additionally, a docking connector can allow system 700 to connect to certain peripherals that allow system 700 to control content output, for example, to audiovisual or other systems.

In addition to a proprietary docking connector or other proprietary connection hardware, system 700 can make peripheral connections 780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

In general with respect to the descriptions herein, a memory device includes: a command bus interface to connect to a unidirectional command bus to a memory controller; an oscillator to measure an amount of delay for the command bus over a time interval; and a data bus interface to connect to a bidirectional data bus to the memory controller, the data bus to pass a value to the memory controller based on the amount of delay measured by the oscillator.

In accordance with an example of the memory device, in one example, the memory device is to automatically send the value to the memory controller as part of an exit from a low power mode. In accordance with any example of the memory device, in one example, the exit from the low power mode comprises a self refresh exit (SRX). In accordance with any example of the memory device, in one example, the exit from the low power mode comprises a power down exit (PDX). In accordance with any example of the memory device, in one example, the data bus is to pass the value to the memory controller at a frequency slower than a runtime data bitrate. In accordance with any example of the memory device, in one example, the data bus is to pass the value to the memory controller at a frequency of ¼ the runtime data bitrate. In accordance with any example of the memory device, in one example, the memory device includes: a register to store the value. In accordance with any example of the memory device, in one example, the oscillator is to periodically measure the amount of delay and store the value in the register. In accordance with any example of the memory device, in one example, the oscillator is to measure the amount of delay in conjunction with an impedance calibration (ZQCal) operation. In accordance with any example of the memory device, in one example, the memory device is to receive a polling request from the memory controller for contents of the register during runtime. In accordance with any example of the memory device, in one example, the oscillator comprises a ring oscillator specific to the command bus.

In general with respect to the descriptions herein, a system includes: a memory controller; a data bus with bidirectional links; a command bus with unidirectional links; and a memory device coupled to the memory controller via the data bus and the command bus, the memory device including: a command bus interface to connect to the command bus; a data bus interface to connect to the data bus; and an oscillator to measure an amount of delay for the command bus over a time interval; wherein the memory device is to pass a value over the data bus to the memory controller based on the amount of delay measured by the oscillator for the command bus.

In accordance with an example of the system, in one example, the memory device is to automatically send the value to the memory controller as part of an exit from a low power mode. In accordance with any example of the system, in one example, the exit from the low power mode comprises a self refresh exit (SRX). In accordance with any example of the system, in one example, the exit from the low power mode comprises a power down exit (PDX). In accordance with any example of the system, in one example, the data bus is to pass the value to the memory controller at a frequency slower than a runtime data bitrate. In accordance with any example of the system, in one example, the data bus is to pass the value to the memory controller at a frequency of ¼ the runtime data bitrate. In accordance with any example of the system, in one example, the system includes: a register to store the value. In accordance with any example of the system, in one example, the oscillator is to periodically measure the amount of delay and store the value in the register. In accordance with any example of the system, in one example, the oscillator is to measure the amount of delay in conjunction with an impedance calibration (ZQCal) operation. In accordance with any example of the system, in one example, the memory device is to receive a polling request from the memory controller for contents of the register during runtime. In accordance with any example of the system, in one example, the oscillator comprises a ring oscillator specific to the command bus. In accordance with any example of the system, in one example, the system includes one or more of: a multicore host processor coupled to the memory controller; a display communicatively coupled to a host processor; a network interface communicatively coupled to a host processor; or a battery to power the system.

In general with respect to the descriptions herein, a method includes: measuring, with an oscillator of a memory device, an amount of delay for a command bus over a time interval, the command bus having unidirectional links for a memory controller to send commands to the memory device; storing a value in a register of the memory device based on the amount of delay measured with the oscillator; and sending, over a data bus, the value from the memory device to the memory controller, the data bus having bidirectional links between the memory controller and the memory device.

In accordance with any example of the method, in one example, automatically sending the value comprises sending the value to the memory controller as part of an exit from a low power mode. In accordance with any example of the method, in one example, the exit from the low power mode comprises a self refresh exit (SRX). In accordance with any example of the method, in one example, the exit from the low power mode comprises a power down exit (PDX). In accordance with any example of the method, in one example, sending the value to the memory controller comprises sending the value over the data bus at a frequency slower than a runtime data bitrate. In accordance with any example of the method, in one example, sending the value to the memory controller comprises sending the value over the data bus at a frequency of ¼ the runtime data bitrate. In accordance with any example of the method, in one example, the method includes: storing the value in a register. In accordance with any example of the method, in one example, the oscillator periodically measures the amount of delay and store the value in the register. In accordance with any example of the method, in one example, the oscillator periodically measures the amount of delay in conjunction with an impedance calibration (ZQCal) operation. In accordance with any example of the method, in one example, the method includes receiving a polling request from the memory controller for contents of the register during runtime. In accordance with any example of the method, in one example, the oscillator comprises a ring oscillator specific to the command bus.

In general with respect to the descriptions herein, a computer readable storage medium includes content stored thereon, which when executed causes a machine to perform a method in accordance with any example of the method in the preceding two paragraphs.

In general with respect to the descriptions herein, a memory controller includes: a command bus interface to connect to a unidirectional command bus to a memory device; and a data bus interface to connect to a bidirectional data bus to the memory device, the data bus to receive a value from the memory device based on an amount of delay measured by an oscillator of the memory device configured to measure an amount of delay for the command bus over a time interval; wherein the memory controller is to configure to determine an adjustment to an input/output (I/O) setting for the command based on the value and configure the I/O setting for the command bus interface in accordance with the adjustment.

In accordance with an example of the memory controller, in one example, the memory device is to automatically send the value to the memory controller as part of an exit from a low power mode. In accordance with any example of the memory controller, in one example, the exit from the low power mode comprises a self refresh exit (SRX). In accordance with any example of the memory controller, in one example, the memory controller is to automatically configure the data bus for slower frequency communication in response to sending a command to trigger the SRX. In accordance with any example of the memory controller, in one example, the exit from the low power mode comprises a power down exit (PDX). In accordance with any example of the memory controller, in one example, the memory controller is to automatically configure the data bus for slower frequency communication in response to sending a command to trigger the PDX. In accordance with any example of the memory controller, in one example, the memory controller is to receive the value at a frequency slower than a runtime data bitrate. In accordance with any example of the memory controller, in one example, the data bus is to pass the value to the memory controller at a frequency of ¼ the runtime data bitrate. In accordance with any example of the memory controller, in one example, the oscillator is to store the value in a register of the memory device. In accordance with any example of the memory controller, in one example, the oscillator is to periodically measure the amount of delay and store the value in the register. In accordance with any example of the memory controller, in one example, the oscillator is to measure the amount of delay in conjunction with an impedance calibration (ZQCal) operation. In accordance with any example of the memory controller, in one example, the memory controller is to send a polling request to the memory device for contents of the register during runtime. In accordance with any example of the memory controller, in one example, the oscillator comprises a ring oscillator specific to the command bus.

In general with respect to the descriptions herein, a second method includes: sending a command to a memory device over a command bus having unidirectional links; receiving over a data bus a value from the memory device, the value based on a measurement with an oscillator of the memory device of an amount of delay for the command bus, the data bus having bidirectional links between the memory controller and the memory device; determining an adjustment to an input/output (I/O) setting for the command based on the value; and configuring the I/O setting for the command bus in accordance with the adjustment.

In accordance with any example of the second method, in one example, receiving the value comprises receiving from the memory device automatically as part of an exit from a low power mode. In accordance with any example of the second method, in one example, the exit from the low power mode comprises a self refresh exit (SRX). In accordance with any example of the second method, in one example, the second method includes automatically configuring the data bus for slower frequency communication in response to sending a command to trigger the SRX. In accordance with any example of the second method, in one example, the exit from the low power mode comprises a power down exit (PDX). In accordance with any example of the second method, in one example, the second method includes automatically configuring the data bus for slower frequency communication in response to sending a command to trigger the PDX. In accordance with any example of the second method, in one example, receiving the value from the memory device comprises receiving the value over the data bus at a frequency slower than a runtime data bitrate. In accordance with any example of the second method, in one example, receiving the value from the memory device comprises receiving the value over the data bus at a frequency of ¼ the runtime data bitrate. In accordance with any example of the second method, in one example, the second method includes reading the value from a register in the memory device. In accordance with any example of the second method, in one example, the second method includes sending a polling request to the memory device for the value, wherein receiving the value from the memory device comprises receiving the value in response to polling request. In accordance with any example of the second method, in one example, the oscillator periodically measures the amount of delay and stores the value in the register. In accordance with any example of the second method, in one example, the oscillator periodically measures the amount of delay in conjunction with an impedance calibration (ZQCal) operation. In accordance with any example of the second method, in one example, the oscillator comprises a ring oscillator specific to the command bus.

In general with respect to the descriptions herein, a computer readable storage medium includes content stored thereon, which when executed causes a machine to perform a second method in accordance with any example of the second method in the preceding two paragraphs.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware, or in software, or in a combination of hardware and software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, data, or the like. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system), such as recordable/non-recordable media (e.g., read only memory (ROM), random access memory (RAM), magnetic disk storage media, optical storage media, flash memory). A communication interface includes any mechanism that interfaces to any of a hardwired, wireless, optical, or other medium to communicate to another device, such as through a memory bus interface, a processor bus interface, an Internet connection, a disk controller, or other device interface. The communication interface can be configured by providing configuration parameters or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs)), embedded controllers, hardwired circuitry, or other components.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory device comprising:
 a command bus interface to connect to a unidirectional command bus to a memory controller;
 an oscillator to measure an amount of delay for the command bus over a time interval; and
 a data bus interface to connect to a bidirectional data bus to the memory controller, the data bus to pass a value to the memory controller based on the amount of delay measured by the oscillator.

2. The memory device of claim 1, wherein the memory device is to automatically send the value to the memory controller as part of an exit from a low power mode.

3. The memory device of claim 2, wherein the exit from the low power mode comprises a self refresh exit (SRX).

4. The memory device of claim 2, wherein the exit from the low power mode comprises a power down exit (PDX).

5. The memory device of claim 2, wherein the data bus is to pass the value to the memory controller at a frequency slower than a runtime data bitrate.

6. The memory device of claim 5, wherein the data bus is to pass the value to the memory controller at a frequency of ¼ the runtime data bitrate.

7. The memory device of claim 1, further comprising:
 a register to store the value.

8. The memory device of claim 7, wherein the oscillator is to periodically measure the amount of delay and store the value in the register.

9. The memory device of claim 8, where the oscillator is to measure the amount of delay in conjunction with an impedance calibration (ZQCal) operation.

10. The memory device of claim 7, wherein the memory device is to receive a polling request from the memory controller for contents of the register during runtime.

11. The memory device of claim 1, wherein the oscillator comprises a ring oscillator specific to the command bus.

12. A system comprising:
 a memory controller;
 a data bus with bidirectional links;
 a command bus with unidirectional links; and a memory device coupled to the memory controller via the data bus and the command bus, the memory device including:

a command bus interface to connect to the command bus;

a data bus interface to connect to the data bus; and an oscillator to measure an amount of delay for the command bus over a time interval;

wherein the memory device is to pass a value over the data bus to the memory controller based on the amount of delay measured by the oscillator for the command bus.

13. The system of claim 12, wherein the memory device is to automatically send the value to the memory controller as part of a self refresh exit (SRX) or a power down exit (PDX).

14. The system of claim 12, wherein the memory device is to pass the value to the memory controller at a frequency slower than a runtime data bitrate.

15. The system of claim 12, the memory device comprising:

a register to store the value.

16. The system of claim 15, wherein the oscillator is to periodically measure the amount of delay and store the value in the register.

17. The system of claim 12, wherein the memory controller is configured to adjust a communication setting for the command bus in response to receiving the value from the memory device.

18. The system of claim 12, further comprising one or more of:

a multicore host processor coupled to the memory controller;

a display communicatively coupled to a host processor;

a network interface communicatively coupled to a host processor; or a battery to power the system.

19. A method comprising:

measuring, with an oscillator of a memory device, an amount of delay for a command bus over a time interval, the command bus having unidirectional links for a memory controller to send commands to the memory device;

storing a value in a register of the memory device based on the amount of delay measured with the oscillator; and sending, over a data bus, the value from the memory device to the memory controller, the data bus having bidirectional links between the memory controller and the memory device.

20. The method of claim 19, wherein sending the value comprises automatically sending the value as part of an exit from a low power mode.

21. The method of claim 20, wherein the exit from the low power mode comprises a self refresh exit (SRX) or a power down exit (PDX).

22. The method of claim 20, wherein sending the value comprises the data bus passing the value to the memory controller at a frequency slower than a runtime data bitrate.

* * * * *